US012627522B2

(12) United States Patent
Wann et al.

(10) Patent No.: US 12,627,522 B2
(45) Date of Patent: May 12, 2026

(54) NETWORKED FOOD PREPARATION APPARATUS

(71) Applicant: Duke Manufacturing Co., St. Louis, MO (US)

(72) Inventors: Benjamin Kingbay Wann, St. Louis, MO (US); Canyon DeVille, Lake St. Louis, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 0 days.

(21) Appl. No.: 19/025,452

(22) Filed: Jan. 16, 2025

(65) Prior Publication Data

US 2025/0158847 A1      May 15, 2025

Related U.S. Application Data

(62) Division of application No. 17/906,096, filed as application No. PCT/US2021/022925 on Mar. 18, 2021, now Pat. No. 12,418,435.

(Continued)

(51) Int. Cl.
| | |
|---|---|
| *H04L 12/28* | (2006.01) |
| *H04L 12/40* | (2006.01) |
| *H04W 84/18* | (2009.01) |

(52) U.S. Cl.
CPC .......... *H04L 12/2816* (2013.01); *H04L 12/40* (2013.01); *H04L 2012/2841* (2013.01);

(Continued)

(58) Field of Classification Search
CPC ................ H04L 12/2816; H04L 12/40; H04L 2012/2841; H04L 2012/40215; H04L 2012/4026; H04W 84/18
See application file for complete search history.

(56) References Cited

U.S. PATENT DOCUMENTS

| | | | |
|---|---|---|---|
| 5,573,691 | A | 11/1996 | Yoshida et al. |
| 5,798,694 | A | 8/1998 | Reber et al. |

(Continued)

FOREIGN PATENT DOCUMENTS

| | | | |
|---|---|---|---|
| CN | 203084467 | U | 7/2013 |
| CN | 104134087 | A | 11/2014 |

(Continued)

OTHER PUBLICATIONS

Sandeep, Manasa et al., Implementation of Iot Based Smart Cooking Environment, pp. 192-195 (2019) 1st International Conference on Advanced Technologies in Intelligent Control, Environment, Computing & Communication Engineering (ICATIECE) (Mar. 19, 2019).

(Continued)

*Primary Examiner* — Laura A Gudorf
(74) *Attorney, Agent, or Firm* — Stinson LLP

(57) ABSTRACT

A kitchen network system comprising a plurality of food preparation apparatuses. Each of the food preparation apparatuses has a physical data bus, a single board computer, and an input/output (I/O) circuit communicatively coupled to the processor via the physical data bus. The single board computer comprises a processor that generates a control signal for controlling an operation of the food preparation apparatus and communicates the control signal on the physical data bus according to a publish/subscribe message-based protocol. In addition, the processor transmits and receives data for provisioning the single board computer to a wireless mesh network and connects the provisioned single board computer as a node on the wireless mesh network. The I/O circuit is responsive to the control signal for driving one or more components of the food preparation apparatus to perform the operation.

17 Claims, 2 Drawing Sheets

Related U.S. Application Data

(60) Provisional application No. 62/991,248, filed on Mar. 18, 2020.

(52) U.S. Cl.
CPC .............. *H04L 2012/40215* (2013.01); *H04L 2012/4026* (2013.01); *H04W 84/18* (2013.01)

(56) References Cited

U.S. PATENT DOCUMENTS

| | | | |
|---|---|---|---|
| 6,104,966 | A | 8/2000 | Haagensen |
| 6,600,418 | B2 | 7/2003 | Francis et al. |
| 7,116,230 | B2 | 10/2006 | Klowak |
| 7,132,926 | B2 | 11/2006 | Vaseloff et al. |
| 7,258,064 | B2 | 8/2007 | Vaseloff et al. |
| 7,411,502 | B2 | 8/2008 | Collins et al. |
| 7,474,210 | B2 | 1/2009 | Roberts et al. |
| 7,525,434 | B2 | 4/2009 | Batra |
| 7,628,107 | B2 | 12/2009 | Vaseloff et al. |
| 7,650,833 | B2 | 1/2010 | Pardoe et al. |
| 7,905,173 | B2 | 3/2011 | Sus et al. |
| 7,922,961 | B2 | 4/2011 | Chisholm et al. |
| 7,973,642 | B2 | 7/2011 | Schackmuth et al. |
| 8,102,264 | B2 | 1/2012 | Rinkes et al. |
| 8,164,457 | B2 | 4/2012 | Dunlap et al. |
| 8,228,200 | B2 | 7/2012 | Kolton et al. |
| 8,416,080 | B2 | 4/2013 | Higham |
| 8,695,489 | B2 | 4/2014 | Ewald et al. |
| 8,786,443 | B2 | 7/2014 | Selgrath et al. |
| 8,844,814 | B2 | 9/2014 | Chang et al. |
| 9,000,896 | B1 | 4/2015 | Kim et al. |
| 9,176,832 | B2 | 11/2015 | Vasseur et al. |
| 9,193,535 | B2 | 11/2015 | Tanaka |
| 9,288,612 | B2 | 3/2016 | Locker et al. |
| 9,445,625 | B2 | 9/2016 | Burkett et al. |
| 9,487,322 | B2 | 11/2016 | Wilkinson |
| 9,746,842 | B2 | 8/2017 | Reese et al. |
| 9,798,987 | B2 | 10/2017 | Chapman et al. |
| 9,917,903 | B2 | 3/2018 | Clernon |
| 9,965,734 | B2 | 5/2018 | Chapman et al. |
| 9,974,015 | B2 | 5/2018 | Zakaria et al. |
| 9,977,928 | B2 | 5/2018 | Sehmer et al. |
| 10,079,691 | B2 | 9/2018 | Christopher et al. |
| 10,111,070 | B2 | 10/2018 | Zakaria et al. |
| 10,111,071 | B2 | 10/2018 | Polo et al. |
| 10,304,020 | B2 | 5/2019 | Chapman, Iii et al. |
| 10,426,282 | B1 | 10/2019 | Hamilton |
| 10,440,546 | B2 | 10/2019 | Polo et al. |
| 10,546,161 | B2 | 1/2020 | Sehmer et al. |
| 10,735,261 | B2 | 8/2020 | Pillai |
| 10,839,170 | B2 | 11/2020 | Sehmer et al. |
| 10,841,874 | B2 | 11/2020 | Zakaria et al. |
| 10,848,567 | B1 | 11/2020 | Von Muenster et al. |
| 10,863,234 | B2 | 12/2020 | Jabara et al. |
| 10,932,107 | B2 | 2/2021 | Bae et al. |
| 10,951,435 | B2 | 3/2021 | Jakobsson |
| 11,023,851 | B2 | 6/2021 | Schoening |
| 11,080,482 | B2 | 8/2021 | Donati et al. |
| 11,082,837 | B2 | 8/2021 | Zavesky et al. |
| 11,105,909 | B2 | 8/2021 | Argentieri et al. |
| 11,124,367 | B2 | 9/2021 | Moore et al. |
| 11,128,486 | B2 | 9/2021 | Yang et al. |
| 11,176,515 | B2 | 11/2021 | Godlewski |
| 2002/0018705 | A1 | 2/2002 | Kawaguchi |
| 2005/0211775 | A1 | 9/2005 | Vaseloff et al. |

| | | | |
|---|---|---|---|
| 2006/0085266 | A1 | 4/2006 | Wei et al. |
| 2007/0144202 | A1 | 6/2007 | Theodos et al. |
| 2007/0251521 | A1 | 11/2007 | Schackmuth et al. |
| 2007/0251667 | A1 | 11/2007 | Ewald et al. |
| 2009/0014279 | A1 | 1/2009 | Bouetard |
| 2009/0266736 | A1 | 10/2009 | Sprishen et al. |
| 2012/0032524 | A1 | 2/2012 | Baarman et al. |
| 2012/0323392 | A1 | 12/2012 | Gerdes et al. |
| 2016/0019451 | A1 | 1/2016 | Selgrath et al. |
| 2016/0327279 | A1 | 11/2016 | Bhogal et al. |
| 2017/0041861 | A1 | 2/2017 | Fuhrmann |
| 2017/0071411 | A1 | 3/2017 | Veltrop et al. |
| 2017/0071412 | A1 | 3/2017 | Veltrop et al. |
| 2017/0134255 | A1 | 5/2017 | Amini et al. |
| 2017/0139385 | A1 | 5/2017 | Young et al. |
| 2017/0290466 | A1 | 10/2017 | Lundberg et al. |
| 2018/0048481 | A1 | 2/2018 | Wann et al. |
| 2018/0081331 | A1 | 3/2018 | Gary, Jr. et al. |
| 2019/0075970 | A1 | 3/2019 | Patterson et al. |
| 2019/0095663 | A1 | 3/2019 | Ayette |
| 2019/0125120 | A1 | 5/2019 | Jenkins et al. |
| 2019/0227536 | A1 | 7/2019 | Cella et al. |
| 2019/0339686 | A1 | 11/2019 | Cella et al. |
| 2020/0048009 | A1 | 2/2020 | Moore et al. |
| 2020/0074522 | A1 | 3/2020 | Balasubramanian et al. |
| 2020/0146504 | A1 | 5/2020 | Patterson |
| 2020/0154246 | A1* | 5/2020 | Ganz ...................... H04W 4/80 |
| 2020/0213101 | A1 | 7/2020 | Zimmerman et al. |
| 2020/0349544 | A1 | 11/2020 | Perarnau Pradell |
| 2020/0349795 | A1 | 11/2020 | Wann et al. |
| 2021/0125142 | A1 | 4/2021 | Bloom et al. |
| 2021/0127251 | A1 | 4/2021 | Kang et al. |
| 2021/0216953 | A1 | 7/2021 | Ramos |
| 2021/0352764 | A1 | 11/2021 | Hamlin et al. |

FOREIGN PATENT DOCUMENTS

| | | | |
|---|---|---|---|
| CN | 208334937 | U | 1/2019 |
| CN | 109358535 | A | 2/2019 |
| CN | 109391527 | A | 2/2019 |
| CN | 109890065 | A | 6/2019 |
| CN | 110392445 | A | 10/2019 |
| CN | 111010324 | A | 4/2020 |
| CN | 111090243 | A | 5/2020 |
| CN | 111263338 | A | 6/2020 |
| CN | 112217694 | A | 1/2021 |
| CN | 112261631 | A | 1/2021 |
| FR | 2885435 | A1 | 11/2006 |
| KR | 2012129043 | A | 11/2012 |
| MX | 2019004073 | A | 11/2019 |
| TW | M388892 | U | 9/2010 |
| TW | 201626767 | A | 7/2016 |
| WO | 2007042248 | A1 | 4/2007 |
| WO | 2012121616 | A1 | 9/2012 |
| WO | 2012152293 | A1 | 11/2012 |
| WO | 2019100014 | A1 | 5/2019 |
| WO | 2021134562 | A1 | 7/2021 |
| WO | 2021188775 | A1 | 9/2021 |

OTHER PUBLICATIONS

Supplementary European Search Report from EP Application No. 21772584.5, dated Feb. 27, 2024, 14 pages.
RFID Reader User Manual Rev 1.0, User Manual RFID Reader Board (Welbilt), 14 pages (No date available).

\* cited by examiner

NETWORKED FOOD PREPARATION APPARATUS

CROSS-REFERENCE TO RELATED APPLICATIONS

This application is a divisional of U.S. patent application Ser. No. 17/906,096, filed Sep. 12, 2022, which is a U.S. national phase application of International Application No. PCT/US2021/022925, filed Mar. 18, 2021, which claims the benefit of U.S. Provisional Patent Application No. 62/991, 248, filed Mar. 18, 2020, the entire disclosures of which are incorporated herein by reference.

BACKGROUND

The present disclosure generally relates to a networked food preparation apparatus, and more particularly to a food preparation apparatus configured to communicate on a low power wireless mesh (e.g., Bluetooth mesh) network.

Food preparation establishments such as restaurants, including quick service or fast food restaurants, have kitchens including various food preparation apparatuses. Conventional techniques for controlling and managing such apparatuses present several challenges. For example, such kitchens often include food preparation apparatuses from several different manufacturers use different communications protocols that cannot securely communicate with each other and with a central kitchen management system.

SUMMARY

A kitchen network system embodying aspects of the present disclosure comprises a plurality of food preparation apparatuses. Each of the food preparation apparatuses has a physical data bus, a single board computer, and an input/output (I/O) circuit communicatively coupled to the processor via the physical data bus. The single board computer comprises a processor that generates a control signal for controlling an operation of the food preparation apparatus and communicates the control signal on the physical data bus according to a publish/subscribe message-based protocol. In addition, the processor transmits and receives data for provisioning the single board computer to a wireless mesh network and connects the provisioned single board computer as a node on the wireless mesh network. The I/O circuit is responsive to the control signal for driving one or more components of the food preparation apparatus to perform the operation.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
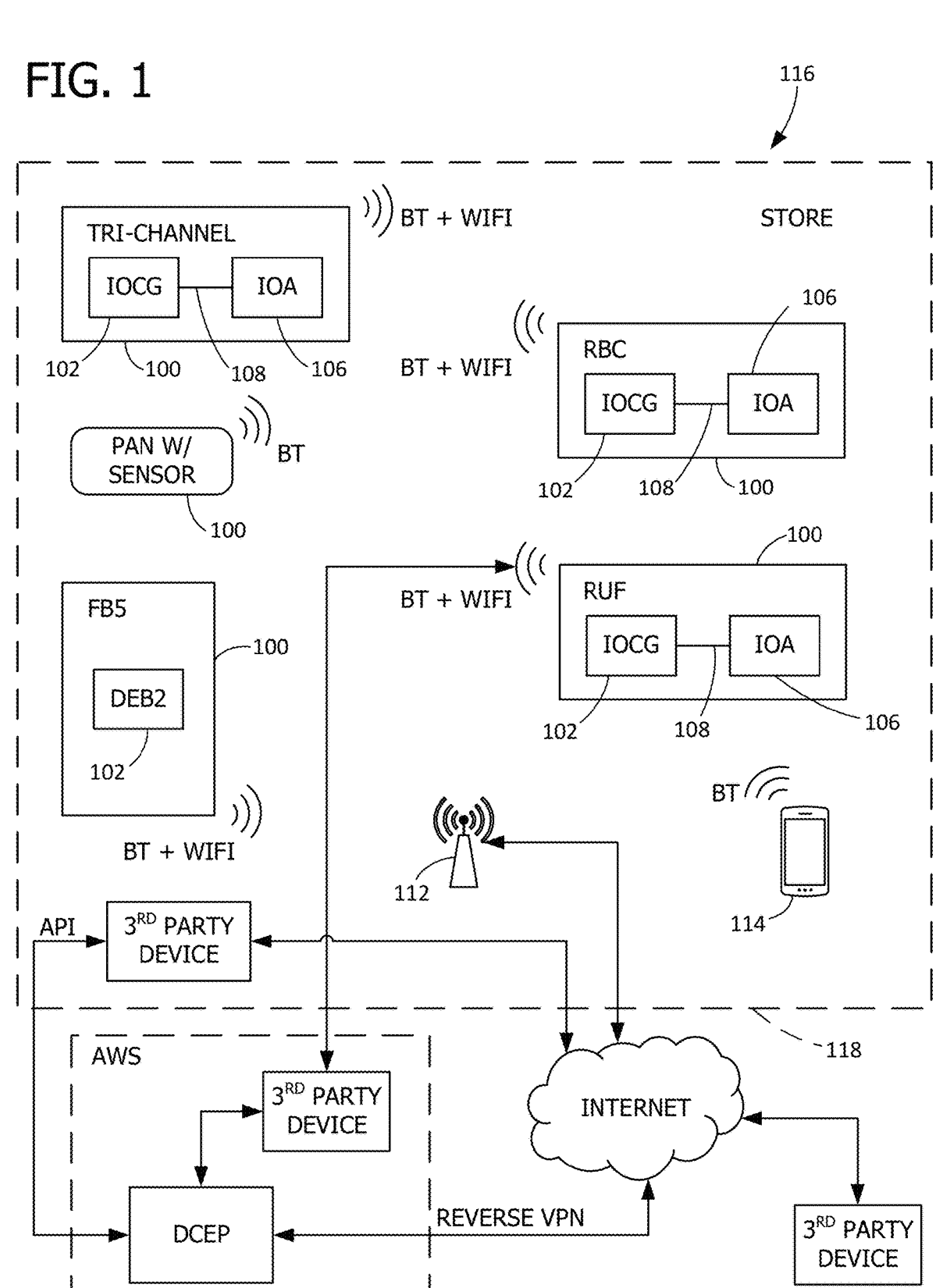
FIG. 1 is a diagram of a kitchen network of food preparation apparatuses according to an embodiment of the present invention.

Referring to the drawings, FIG. 1 illustrates a plurality of food preparation apparatuses 100 embodying aspects of the present invention. In the illustrated example, each food preparation apparatus 100 is configured as a food preparation apparatus for use in a food preparation establishment, such as a restaurant or other commercial kitchen, including a quick service or "fast food" restaurant. In an aspect, food preparation apparatus 100 is part of a food preparation establishment network system used for "smart kitchen" purposes, such as forecasting or predicting food that will be ordered in the future, preparing food, monitoring food preparation and food inventory, providing indications and instructions regarding food preparation and food inventory, labor scheduling management, asset tracking, smart appliance communication, sensor network integration, global inventory control, facilitating communications between devices in the network for these and other purposes, and the like.

The food preparation apparatus 100 may include various food cooking devices. An example of one such cooking device is an oven, and it will be understood that other cooking devices, such as fryers, microwaves, conditioning cabinets (e.g. for dough, etc.), grills, and the like can be used without departing from the scope of the present invention. The food preparation apparatuses 100 may also include one or more food holding units adapted for holding food at a suitable temperature (e.g., cool temperature, ambient temperature, and/or warm temperature) such as refrigerated back counters (RBC), tri-channel cold pan counters, steam tables, infrared holding units, heat sink holding units, reach-in under-counter refrigerators or freezers (RUF), hot/cold/freeze or hot/cold/frost units, or other holding units, etc. The food preparation apparatus 100 may also include various other food handling apparatuses such as food washers, sanitizers, processors, pans equipped with position sensors, etc.

Referring further to FIG. 1, the apparatus 100 in the illustrated embodiment includes a single board computer 102, a touchscreen controller (not shown), and an I/O circuit 106. In an embodiment, the single board computer 102 includes a processor, a memory, and a data bus interface; the touchscreen controller includes a processor, a flash data memory (RAM), a data bus interface, and an electronically erasable programmable read-only memory (EEPROM); and the I/O circuit 106 includes a processor, a flash data memory, and a data bus interface. The single board computer 102, touchscreen controller, and I/O circuit 106 are communicatively coupled to each other through a physical data bus 108 via their respective data bus interfaces. In the illustrated embodiment, single board computer 102 is configured to execute the operations of the touchscreen controller. In another embodiment, single board computer 102, touchscreen controller, and/or I/O circuit 106 could be embodied on the same printed circuit board, in which case a physical data bus may not be used for communication between the components.

Commonly assigned International Application No. PCT/US2018/061844, the entire disclosure of which is incorporated herein by reference, discloses the single board computer 102 configured to bridge the physical data bus 108 with a virtual data bus, store recipes, and provide, via a web server, a graphical user interface (GUI) for enabling a user of a client computer to configure recipe settings and/or firmware settings for food preparation apparatus 100, as further described herein. The single board computer 102 provides a core app, a web server, a database, and a virtual communication bus via a software environment (e.g., processor 102A executing processor readable instructions stored on memory 102B, etc.), as further described herein. The single board computer 102 may be referred to as an embedded computing device, an embedded computer, an embedded control device, and/or an embedded controller in accordance with one or more aspects of the disclosure.

An exemplary single board computer is available from DAVE Embedded Systems. In an embodiment, the processor comprises an ARM based CPU running at speeds of about 500 Mhz to 1 GHz and the memory comprises 1 GB of random access memory (RAM) (broadly "non-transitory computer-readable storage medium"). The data bus interface may comprise a single board computer with various wireline protocol interconnects, such as Serial Peripheral Interface (SPI), I2C (I2C), Controller Area Network (CAN), RS-485, and RS-232, and having several (e.g., sixty or more) general purpose input/output pins. In this embodiment, the processor is configured to execute software for establishing a reverse virtual private network (VPN). In addition, the processor is an edge device capable of offline processing, imaging, video, artificial intelligence, and/or voice commands. As an example, the imaging capabilities enable use of cameras to detect when bread dough has been proofed and is ready for baking.

Another exemplary single board computer is an i.MX RT Crossover MCU available from NXP Semiconductors. In an embodiment, the processor comprises an ARM based microcontroller unit (MCU) running at speeds of about 500 Mhz to 1 GHz and the memory comprises on-chip RAM of about 128 kB to 2 MB (broadly "non-transitory computer-readable storage medium"). The data bus interface may comprise a single board computer with various wireline protocol interconnects, such as SPI, I2C, and CAN, and having several general purpose input/output pins. In addition, the processor is capable of some edge device functions.

Yet another exemplary single board computer is an ESP32 chip available from Espressif. In an embodiment, the processor comprises a CPU running at speeds of about 80 Mhz to 240 MHz and the memory comprises on-chip RAM of about 520 kB (broadly "non-transitory computer-readable storage medium"). The data bus interface may comprise a single board computer with various wireline protocol interconnects, such as SPI, I2C, and CAN, and having several general purpose input/output pins. In this embodiment, the single board computer has a built-in antenna, both Wi-Fi and Bluetooth capabilities, and supports graphics. Compared to higher end single board computers, this embodiment has less memory and processing capability but is less expensive.

The I/O circuit 106 is configured to control various loads (e.g., heaters, valves, fans, etc.) in apparatus 100 based on commands from single board computer 102. In an embodiment, I/O circuit 106 (referred to as IOA in FIG. 1 and FIG. 2) includes power, relays, switch inputs, a resistance temperature detector (RTD), or the like. The I/O circuit 106 is configurable with four DIP switches, for example, to accommodate 16 different outputs.

The physical data bus 108 is configured to facilitate the exchange of data among the control components of apparatus 100, such as single board computer 102 and i/O circuit 106. The single board computer 102 and I/O circuit 106 are configured to publish messages (e.g., data) to the physical data bus 108 and subscribe to messages on the physical data bus 108. In this manner, single board computer 102 and I/O circuit 106 are configured to communicate via a publish/subscribe ("pub/sub") protocol. In an embodiment, physical data bus 108 is a CAN bus.

FIG. 1 further illustrates one embodiment of a network system embodying aspects of the present invention that includes the food preparation apparatus 100, a router 112, and a local computer 114 communicatively coupled via a communications network 116. In the illustrated embodiment, the local computer 114 is a smartphone but could be embodied by a variety of computing devices. In an embodiment, the communications network 116 comprises at least in part a kitchen network. In another embodiment, the communications network 116 comprises at least in part a food preparation establishment network system used for "smart kitchen" purposes.

According to aspects of the present disclosure, the communications network 116 comprises a mesh network on which one or more food preparation apparatus 100, router 112, and local computer 114 are nodes. Those skilled in the art are familiar with mesh networks in which infrastructure nodes (e.g., bridges, switches, and other infrastructure devices) connect directly, dynamically, and non-hierarchically to as many other nodes as possible in a many-to-many relationship and cooperate with one another to efficiently route data from/to clients. For example, food preparation apparatus 100, router 112, and local computer 114 may all be physically located within the same food preparation establishment 118, such as a restaurant or other commercial kitchen, including a quick service or "fast food" restaurant. In an embodiment, a plurality of food preparation apparatuses 100 is communicatively coupled to the router 112 and/or local computer 114 via mesh network 116. The router 112 is configured to communicatively couple food preparation apparatus 100 and local computer 114 on mesh network 116 to an external communications network such as the internet.

In an embodiment, the single board computer 102 of one or more of the apparatuses 100 is configured for low energy communications in accordance with, for example, the Bluetooth Low Energy (BLE) standard and mesh network 116 comprises a Bluetooth mesh network. For example, single board computer 102 (referred to as IOCG in FIG. 1 and FIG. 2) has built-in Bluetooth and Wi-Fi capabilities. The single board computer 102 can function as a gateway thus eliminating the need for a separate Zigbee or similar gateway. Accordingly, the single board computer 102 in this embodiment can be a node on mesh network 116 and/or a wireless gateway. As nodes, the single board computers 102 of food preparation apparatuses 100 are configurable to receive firmware updates via mesh network 116. The local computer 114 is configurable to operate as a "master control" computer on the Bluetooth mesh network 116 for changing settings on devices, set auto schedules, update firmware, etc. In one example, the local computer 114 can be used to make updates to software, firmware, and/or operational settings of some or all of the apparatuses 100 in bulk (e.g., pushing updates/changes to all of the apparatuses in a group instead of updating each individual apparatus in separate processes). Via the mesh network 116, the local computer 114 can pair with all of the nodes in a "one-to-many" arrangement which has efficiency and other advantages over a "one-to-one" pairing arrangement.

Moreover, each apparatus 100 is configurable such that it has its own CAN bus network. For instance, I/O circuits 106 output messages to physical data bus 108, which is a CAN bus. The mesh network (i.e., communications network 116) connects to CAN bus networks within the store 118. A smartphone (i.e., local computer 114), can connect to the mesh network 116 via a proxy server. Connecting to the mesh network 116 enables connection to the CAN communications in apparatuses 100 as well as connection to a cloud-based kitchen management system, such as the Duke Connected Equipment Platform (DCEP), which handles recipe management, operation management, equipment/asset management, etc. In other words, single board computer 102 functions to merge or bridge CAN bus and wireless networks. A user can pull diagnostics and/or maintenance information from every node on mesh network 116 via a mobile app executing on the smartphone. In this embodiment, local computer 114 need not be coupled directly to the mesh network 116, which prevents the risk of an outside maintenance person accessing the restaurant's internal network.

Aspects of the present disclosure permit layers of authentication keys for improved network security. A Bluetooth mesh network requires multiple layers of encryption. In an embodiment, the manufacturer ships a network key stored in single board computer 102 and maintains a master key. A mobile phone app stores a network key, which it receives from the manufacturer for authentication. The app mates with the food preparation apparatus 100 that was shipped with the same key to connect to the network 116. Encryption/authentication can be extended to third party devices from different vendors by having these devices on the master key and then having a second layer key specific to the first party manufacturer. Multiple vendors could communicate via the same Bluetooth mesh network, all encrypted/isolated in Bluetooth from each other or could share authentication keys (different levels to permit sharing).

Figure 2:
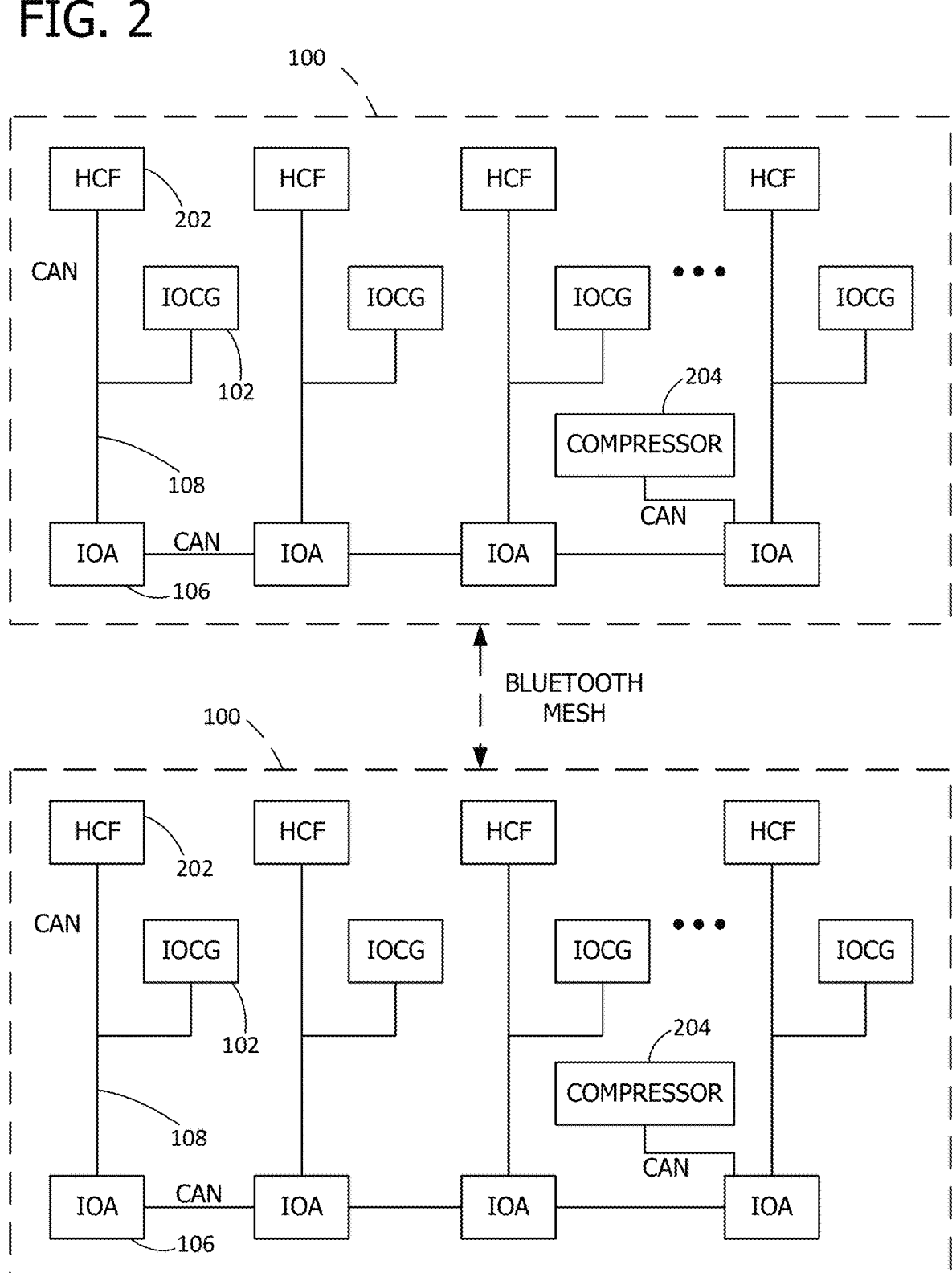
FIG. 2 is a diagram of an example food preparation apparatus for use in the network of FIG. 1.

FIG. 2 illustrates a Hot/Cold/Frost product embodying food preparation apparatus 100. In this embodiment, the apparatus 100 includes a plurality of wells 202, each driven by a corresponding I/O circuit 106, which is controlled by a corresponding single board computer 102. The single board computers 102 and I/O circuits 106 communicate with each other and with a shared compressor 204 on a CAN network as shown in FIG. 2. In an embodiment, each single board computer 102 pairs with the corresponding I/O circuit 106 via CAN such that it ignores messages from other I/O circuits 106. In operation, single board computers 102 control their associated I/O circuits 106 to drive the compressor 204 to chill the wells 202. Alternatively, single board computers 102 control their associated I/O circuits 106 to drive one or more heaters (not shown) to heat the wells 202. A plurality of food preparation apparatuses 100 may be coupled together via the Bluetooth mesh network (i.e., communications network 106).

In an embodiment, food preparation apparatus 100 comprises a pan equipped with a Bluetooth-enabled sensor (e.g., battery-free Bluetooth sticker sensor/tag) communicatively coupled to mesh network 116. As the pan moves throughout the kitchen, Bluetooth mesh network 116 is configured to track its movement. Multiple pans could be used each having a respective Bluetooth-enabled sensor for tracking pan movement.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A commercial kitchen pan tracking system comprising:
a Bluetooth mesh network comprising a plurality of Bluetooth nodes each forming part of the Bluetooth mesh network;
a plurality of pans each having a battery-free Bluetooth sensor thereon, the Bluetooth sensor being in operative communication with the Bluetooth mesh network for tracking movement of the plurality of pans in the Bluetooth mesh network;
a plurality of commercial food preparation apparatuses, the commercial food preparation apparatuses including at least some of the plurality of Bluetooth nodes forming the Bluetooth mesh network, wherein a first commercial food preparation apparatus of the plurality of commercial food preparation apparatuses comprises a wifi gateway in communication with a router, said wifi gateway operatively connecting the Bluetooth mesh network with the Internet via the router.

2. The commercial kitchen pan tracking system of claim 1, wherein one or more of the commercial food preparation apparatuses comprises:
a physical data bus;
a single board computer, comprising:
a processor,
a built-in antenna, and
a memory communicatively coupled to the processor, the memory storing processor-executable instructions that, when executed by the processor:
generate a control signal for controlling an operation of the food preparation apparatus,
communicate the control signal on the physical data bus according to a publish/subscribe message-based protocol;
transmit and receive data, via the antenna, for provisioning the single board computer to the Bluetooth mesh network, and
connect the provisioned single board computer to the Bluetooth mesh network, wherein the single board computer is one of the nodes of the Bluetooth mesh network.

3. The commercial kitchen pan tracking system of claim 2, further comprising an input/output (I/O) circuit communicatively coupled to the processor via the physical data bus and configured to receive the control signal therefrom, the I/O circuit responsive to the control signal for driving one or more components of each food preparation apparatus to perform the operation thereof.

4. The commercial kitchen pan tracking system of claim 3, wherein the message-based protocol processor by which the single board computer and the I/O circuit communicate on the physical data bus is a Controller Area Network (CAN) protocol.

5. The commercial kitchen pan tracking system of claim 3, wherein the one or more components of the food preparation apparatuses comprises at least one of: a convection fan motor, a vent fan, or a water valve.

6. The commercial kitchen pan tracking system of claim 3, wherein at least one of the food preparation apparatuses comprises a relay circuit coupled to the I/O circuit, the relay circuit associated with the one or more components of the food preparation apparatuses and configured to switch on and off the one or more components responsive to the control signal from the processor.

7. The commercial kitchen pan tracking system of claim 3, wherein the I/O circuit outputs data representative of a state of at least one of the food preparation apparatuses and the single board computer is responsive thereto to generate the control signal.

8. The commercial kitchen pan tracking system of claim 7, wherein at least one of the food preparation apparatuses comprises a sensor coupled to the I/O circuit, the sensor detecting information regarding the state of the one or more components of the at least one of the food preparation apparatuses.

9. The commercial kitchen pan tracking system of claim 8, wherein the sensor comprises at least one of: a cavity temperature sensor, an ambient temperature sensor, an air inlet temperature sensor, a voltage detection sensor, or a current sensor.

10. The commercial kitchen pan tracking system of claim 2, wherein the single board computer comprises a Bluetooth Low Energy (BLE) device.

11. The commercial kitchen pan tracking system of claim 2, wherein the single board computer is coupled to a cloud service via a virtual data bus.

12. The commercial kitchen pan tracking system of claim 2, wherein the memory further stores processor-executable instructions that, when executed by the processor, transmit and receive data, via the antenna, for communicatively coupling the single board computer to the virtual data bus.

13. The commercial kitchen pan tracking system of claim 2, wherein at least one of the food preparation apparatuses comprises a touchscreen coupled to the single board computer and configured for interaction with a user thereof.

14. The commercial kitchen pan tracking system of claim 13, wherein the single board computer is responsive to user input received via the touchscreen to generate the control signal.

15. A commercial kitchen pan tracking system comprising:
a Bluetooth mesh network comprising a plurality of Bluetooth nodes each forming part of the Bluetooth mesh network;
a plurality of pans each having a battery-free Bluetooth sensor thereon, the Bluetooth sensor being in operative communication with the Bluetooth mesh network for tracking movement of the plurality of pans in the Bluetooth mesh network; and
a portable computing device coupled to a cloud service and to the Bluetooth mesh network, wherein the portable computing device is another one of the nodes of the Bluetooth mesh network, and wherein the cloud service includes a database storing information associated with one or more food preparation apparatuses on the Bluetooth mesh network, wherein the information stored in the database comprises identifier data relating to at least one of: a site, a controller, or an input/output (I/O) board.

16. The commercial kitchen pan tracking system of claim 15, wherein the cloud service comprises a cloud-based kitchen management system.

17. The commercial kitchen pan tracking system of claim 15, wherein the identifier data stored in the database is cross-referenced with at least one of: a product warranty, service part availability, or service history.

*   *   *   *   *